United States Patent
Hars (10) Patent No.: US 8,583,711 B2
(45) Date of Patent: Nov. 12, 2013

(54) RANDOM NUMBER GENERATION SYSTEM WITH RING OSCILLATORS

(75) Inventor: Laszlo Hars, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 64 days.

(21) Appl. No.: 12/629,274

(22) Filed: Dec. 2, 2009

(65) Prior Publication Data

US 2011/0128081 A1    Jun. 2, 2011

(51) Int. Cl.
G06F 7/58    (2006.01)

(52) U.S. Cl.
USPC ........... 708/250; 708/251; 708/252; 708/253; 708/254; 708/255; 708/256; 331/57; 331/78

(58) Field of Classification Search
USPC ................. 331/57, 78; 708/250–256
See application file for complete search history.

(56) References Cited

U.S. PATENT DOCUMENTS

| | | | |
|---|---|---|---|
| 4,122,405 A | 10/1978 | Tietz et al. | |
| 4,641,102 A | 2/1987 | Coulthart et al. | |
| 4,799,259 A | 1/1989 | Ogrodski | |
| 5,471,176 A | 11/1995 | Henson et al. | |
| 6,675,113 B2 | 1/2004 | Hars | |
| 6,891,395 B2* | 5/2005 | Wells et al. | 326/38 |
| 6,931,425 B2 | 8/2005 | Xie et al. | |
| 6,947,960 B2 | 9/2005 | Hars | |
| 6,993,543 B2 | 1/2006 | Hars | |
| 7,031,991 B2 | 4/2006 | Hars | |
| 7,047,262 B2 | 5/2006 | Hars | |
| 7,124,155 B2 | 10/2006 | Hars | |
| 7,149,764 B2 | 12/2006 | Henry et al. | |
| 7,424,500 B2* | 9/2008 | Fukushima et al. | 708/251 |
| 2003/0156713 A1 | 8/2003 | Hars | |
| 2003/0158875 A1 | 8/2003 | Hars | |
| 2003/0158876 A1 | 8/2003 | Hars | |
| 2003/0187890 A1 | 10/2003 | Hars | |
| 2003/0200238 A1 | 10/2003 | Hars | |
| 2006/0069706 A1* | 3/2006 | Lazich et al. | 708/251 |
| 2007/0273408 A1* | 11/2007 | Golic | 326/93 |

(Continued)

OTHER PUBLICATIONS

Author: Chengxin Liu Title: A digital-PLL-based true random number generator Date: Jul. 25-28, 2005 Publisher: IEEE (Research in Microelectronics and Electronics, 2005 PhD) vol. 1, on pp. 113-116 vol. 1 Pertinent pp. 113-116.*

(Continued)

*Primary Examiner* — Arnold Kinkead
*Assistant Examiner* — Richard Tan
(74) *Attorney, Agent, or Firm* — Cesari & Reed, LLP; Kirk A. Cesari; Christian W. Best (57) ABSTRACT

A random number generation system comprising one or more ring oscillators configured to generate entropy due to accumulated phase drift. A random number generator can include a ring oscillator configured to switch between a first state in which a signal of the ring oscillator oscillates between logic levels, and a second state in which the signal at least partially settles to one of the logic levels. The random number generator can also include a counter configured to measure a count of pulses of the signal and a whitener mechanism configured to receive the signal from the ring oscillator, latch a logic level of the signal from the ring oscillator, latch the count of pulses from the counter, and generate a random number based on the logic level and the count of pulses. Corresponding methods may also be performed.

18 Claims, 7 Drawing Sheets

(56) References Cited

U.S. PATENT DOCUMENTS

| | | |
|---|---|---|
| 2008/0313249 A1 | 12/2008 | Fukushima et al. |
| 2009/0077146 A1 | 3/2009 | Hars |
| 2009/0077147 A1 | 3/2009 | Hars |
| 2009/0106339 A1 | 4/2009 | Vasyltsov et al. |
| 2009/0110188 A1 | 4/2009 | Dolgunov et al. |
| 2009/0132624 A1 | 5/2009 | Haselsteiner et al. |
| 2009/0222502 A1* | 9/2009 | Ikegami et al. ............. 708/251 |

OTHER PUBLICATIONS

"Cryptographically Secure Pseudorandom Number Generator", Wikipedia, 2009, <http://en.wikipedia.org/wiki/Cryptographically_secure_pseudorandom_number_generator>.

Rick Walker: "A Monolithic High-Speed Voltage Controlled Ring Oscillator", Instrument Technology Department, HP Labs, Palo Alto, CA.

* cited by examiner

RANDOM NUMBER GENERATION SYSTEM WITH RING OSCILLATORS

BACKGROUND

The present disclosure is directed to systems for generating random numbers. In particular, the present disclosure is directed to random number generation systems containing ring oscillators.

There are many applications that require the fast production of random numbers having high levels of entropy. Such applications include cryptographic key generation in key servers, session keys, and nonces; simulations; Monte Carlo or randomized computations; dithering; gambling; video games; and the like. Often buffered, off-line generated random numbers may be used. However, the necessary large secure buffer is typically expensive and may introduce a significant latency for the buffer to be filled. Thus, there is an ongoing need for techniques and systems for efficiently generating random numbers.

SUMMARY

A first aspect of the present disclosure is directed to a random number generation system that includes a ring oscillator that is configured to switch between a first state in which a signal of the ring oscillator oscillates between logic levels, and a second state in which the signal at least partially settles to one of the logic levels. The random number generation system also includes a circuit configured to measure a time required for the signal to at least partially settle to one of the logic levels.

Another aspect of the present disclosure is directed to a random number generation system that includes a signal generator, a plurality of inverters, and a gate having a first input operably coupled to the signal generator, a second input operably coupled to one of the inverters, and an output operably coupled to a second of the inverters. The gate is configured to function as an inverter when a signal from the signal source is at a first logic level and as a buffer when the signal is at a second logic level. The random number generation system also includes a counter operably coupled to at least one of the plurality of inverters or the output of the gate.

Another aspect of the present disclosure is directed to a method for generating a random number. The method includes generating phase drift in an oscillating signal, latching the oscillating signal to at least partially settle to a logic level, and measuring a time required for the latched signal to settle to the logic level.

Another aspect of the present disclosure is directed to a random number generation system that includes a gate chain and a feedback network. The gate chain includes a first plurality of inverters, and a gate having a first input operably coupled to one of the first plurality of inverters, a second input, and an output. A second of the first plurality of inverters is operably coupled to the output of the gate. The feedback network also includes a second plurality of inverters, where the second input of the gate is operably coupled to one of the second plurality of inverters.

DETAILED DESCRIPTION

The present disclosure is directed to systems and processes for generating random numbers with the use of one or more ring oscillators. In one aspect (shown in FIGS. 1-8), the ring oscillator(s) are each configured to switch between a first state (referred to an oscillating state) and a second state (referred to as a latched state). While in the oscillating state, the ring oscillator generates an output signal that oscillates between logic levels "0" and "1". Over successive cycles through the ring oscillator, the oscillating output signal desirably accumulates random phase drift due to noise from internal and external system sources.

When switched to the latched state, the ring oscillator may function as a latch circuit, thereby allowing the oscillating output signal to settle to a logic level. As discussed below, the time required for the output signal to settle to a logic level is dependent on the edge locations of the output signal relative to edge locations of a control signal. Because the edge locations of the output signal may vary due to random phase drifting, the resulting settling time may also vary. As it turns out, small phase differences of the signal pulses may lead to large differences in settling times, which effectively amplifies the randomness obtained from the phase drifting. As such, the time required for the output signal to settle to a logic level, as well as the value of the logic level itself, may be measured to provide bits having high levels of entropy. The resulting bits may then be used to generate random numbers for a variety of applications.

Figure 1:
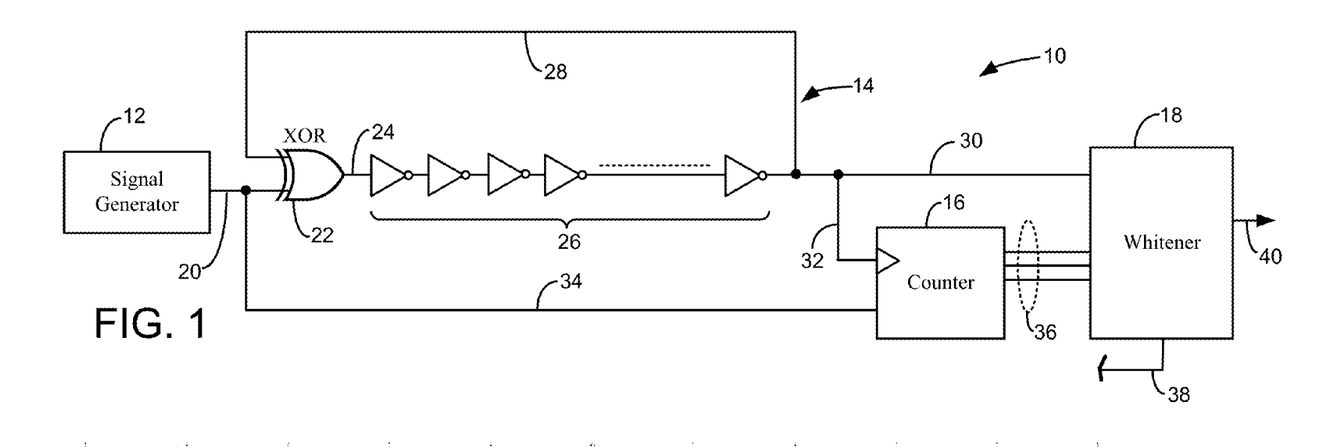
FIG. 1 is a logic diagram of a random number generation system of a first embodiment of the present disclosure, which includes a ring oscillator configured to switch between an oscillating state and a latched state.

FIG. 1 is a logic diagram of system 10, which is a suitable system for generating random numbers and may be a component of a variety of different devices. Suitable devices that may incorporate system 10 include those requiring seeding of random numbers, such as data storage devices, smart cards, cell phones, personal digital assistants, computers, game consoles, arcade game terminals, casino consoles, modems, wireless network hubs, security tokens, and the like.

System 10 includes signal generator 12, ring oscillator 14, counter 16, and whitener 18, where ring oscillator 14 is configured to switch between an oscillating state and a latched state based on control signals received from signal generator 12. Signal generator 12 is a controller-operated signal generator that generates and transmits control signals along input line 20. Signal generator 12 may be any suitable type of signal generator, such as a pulse generator (e.g., clock signal generators), which may operate under a variety of different pulse frequencies and duty cycles.

Ring oscillator 14 includes XOR gate 22, signal line 24, inverters 26, feedback line 28, and output line 30. XOR gate 22 is an exclusive OR gate that includes a first input coupled to input line 20 and a second input coupled to feedback line 28. XOR gate 22 also includes an output coupled to a first inverter of inverters 26 via signal line 24. Inverters 26 are a plurality of NOT gates that are operably coupled in a serial manner to oscillate the output signal of ring oscillator 14 on output line 30. As used herein, the term "operably coupled" includes arrangements where an output of one gate or circuit is coupled to an input of another gate or circuit, and also includes arrangements having one or more intermediary gates (e.g., buffer gates) coupled between the given gates or circuits.

In the shown embodiment, ring oscillator 14 includes an odd number of inverters 26, which facilitate the oscillating of the output signal by looping the signal through feedback line 28 to XOR gate 22. During successive cycles through ring oscillator 14, the output signal accumulates phase drift due to internal noise, or noise from external sources. The extent of phase drifting may vary depending on a variety of factors, such as the types and levels of system noise that ring oscillator 14 is subjected to, the number of inverters 26 in ring oscillator 14, the arrangements of inverters 26 along ring oscillator 14, and the like.

The number of inverters 26 in ring oscillator 14 may vary depending on desired performance characteristics. Examples of suitable numbers of inverters 26 include at least 5 inverters, with particularly suitable numbers range from 9 inverters to 65 inverters, and with even more particularly suitable numbers ranging from 15 inverters to 29 inverters. In alternative embodiments, ring oscillator 14 may also include a variety of other gates (e.g., buffer gates) and design arrangements. For example, ring oscillator 14 may include multiple feedback lines 28 coupled to a variety of gates, such as under Fibonacci and Galois ring arrangements. In one embodiment, as discussed below, ring oscillator 14 may also include complex feedback loops to further accumulate phase drifting.

Feedback line 28 is a signal line coupled to output line 30 to route the output signal from the last inverter of inverters 26 back to XOR gate 22. Output line 30 is also coupled to whitener 18 to transmit the output signal of ring oscillator 14 to whitener 18. This arrangement allows ring oscillator 14 to function in either the oscillating state or the latched state based on the control signal transmitted to XOR gate 22 from signal generator 12. This is illustrated below in Table 1.

TABLE 1

| Input Signal from Signal Generator | Feedback Signal | Output from XOR Gate |
|---|---|---|
| 0 | 0 | 0 |
| 0 | 1 | 1 |
| 1 | 0 | 1 |
| 1 | 1 | 0 |

As shown in Table 1, when signal generator 12 transmits a control signal to XOR gate 22 having a logic level "0", XOR gate 22 outputs a signal having the same logic level as the feedback signal received from feedback line 28. Thus, XOR gate 22 merely functions as a delay element. The signal cycling through ring oscillator 14 continues to oscillate between the logic levels "0" and "1" due to the odd number of inverters 26. While ring oscillator 14 remains in this oscillating state, the resulting output signal from ring oscillator 14 (along output line 30) oscillates between the logic levels "0" and "1" with the pulse phases randomly drifting due to system noise.

When a random number is desired, signal generator 12 may flip the control signal transmitted to XOR gate 22 to a logic level "1". As shown above in Table 1, when the control signal from signal generator 12 has a logic level "1", XOR gate 22 outputs a signal having a polarity that is reversed from the signal received from feedback line 28. Thus, XOR gate 22 switches from functioning as a delay element to functioning as an inverter. This effectively provides an even number of inverters in ring oscillator 14, which causes the oscillating output signal on output line 30 to begin to settle to a logic level.

As further shown in FIG. 1, counter 16 is coupled to output line 30 via signal line 32, to input line 20 via signal line 34, and to whitener 18 via output lines 36. This arrangement allows counter 16 to measure the time required for the output signal from ring oscillator 14 to settle to a logic level by counting the number of pulses that the output signal produces before settling to the logic level. For example, when counter 16 receives a control signal from signal generator 12 having a logic level "1", counter 16 is desirably reset to zero counts and begins counting the pulses of the settling output signal from ring oscillator 14. When the output signal settles to the logic level, the resulting pulse count may be transmitted to whitener 18 via output lines 36.

Whitener 18 is a mechanism for modifying statistical distributions of the signals received from output lines 30 and 36 to increase the level of randomness at the expense of reducing the number of output bits (i.e., the throughput or yield). In the embodiment shown in FIG. 1, whitener 18 receives a control signal from a separate control source (not shown) via control line 38. The control signal desirably allows whitener 18 to latch the received signals from output lines 30 and 36, thereby capturing the resulting logic level of the output signal from output line 30 and the pulse count from output line 36. Based on the latched values, whitener 18 may then whiten one or both of the latched logic level and/or pulse counts to generate random numbers. For example, whitener 18 may contain processing elements, memory for previous values, intermediate results, and constants, thereby it may incorporate one or more hashing functionalities, such as an XOR tree, a linear feedback shift register, arithmetic hash functions, Secure Hash Algorithm (SHA) functions, Advanced Encryption Standard (AES) functions, Data Encryption Standard (DES) functions, and combinations thereof. The resulting generated random number may be transmitted from whitener 18 on output line 40 to a desired location. The generated random number accordingly exhibits entropy levels based in part on the randomness of the logic level and pulse counts.

In the embodiment shown in FIG. 1, signal generator 12 may synchronize the states of ring oscillator 14 with the operation of counter 16. Thus, when ring oscillator 14 is in the oscillating state, counter 16 is desirably stopped. This prevents counter 16 from counting the pulses of the output signal from ring oscillator 14 while ring oscillator 14 is in the oscillating state. However, when ring oscillator 14 is switched to the latched state, counter 16 is desirably reset and begins counting the number of pulses required for the output signal to settle to a logic level, or until a predetermined time limit expires. The logic level at the time of stopping the counter may be transmitted to whitener 18 via output line 30, and the resulting pulse count may then be transmitted to whitener 18 via output lines 36. In alternative embodiments, ring oscillator 14, counter 16, and/or whitener 18 may be controlled by separate control signals. For example, counter 16 and/or whitener 18 may receive starting and stopping signals that are independent of the control signals from signal generator 12. Additionally, while signal line 34 is shown in FIG. 1 as being connected to input line 20, in alternative embodiments signal line 34 may alternatively be connected to a separate port of signal generator 12 (or a separate signal generator) to provide reset/start-counting and stop-counting/latch signals.

The above-discussed process may be repeated multiple times by pulsing the control signal between logic levels "0" and "1", thereby allowing multiple output signals and pulse counts to be generated and transmitted to whitener 18. The pulse frequency of the control signal may vary depending on the design arrangement of ring oscillator 14, and desirably allows the output signal to accumulate a sufficient amount of phase drift before latching ring oscillator 14. Examples of suitable pulse frequencies for the control signal range from about 5 kilohertz (kHz) to about 500 kHz, with particularly suitable pulse frequencies ranging from about 100 kHz to about 400 kHz, where the pulse frequencies are based on a 50% duty cycle.

The multiple output signals and pulse counts transmitted to whitener 18 may then be combined to generate random numbers having higher levels of entropy. For example, in a ring oscillator arrangement having 15 inverter-buffer pairs and an on-off signal clock having a frequency of 390 kHz with a 50% duty cycle, about 6 bits of entropy may be attained per clock cycle with good distribution. This corresponded to a throughput of about 2.34 megabits/second of entropy.

Figure 2:
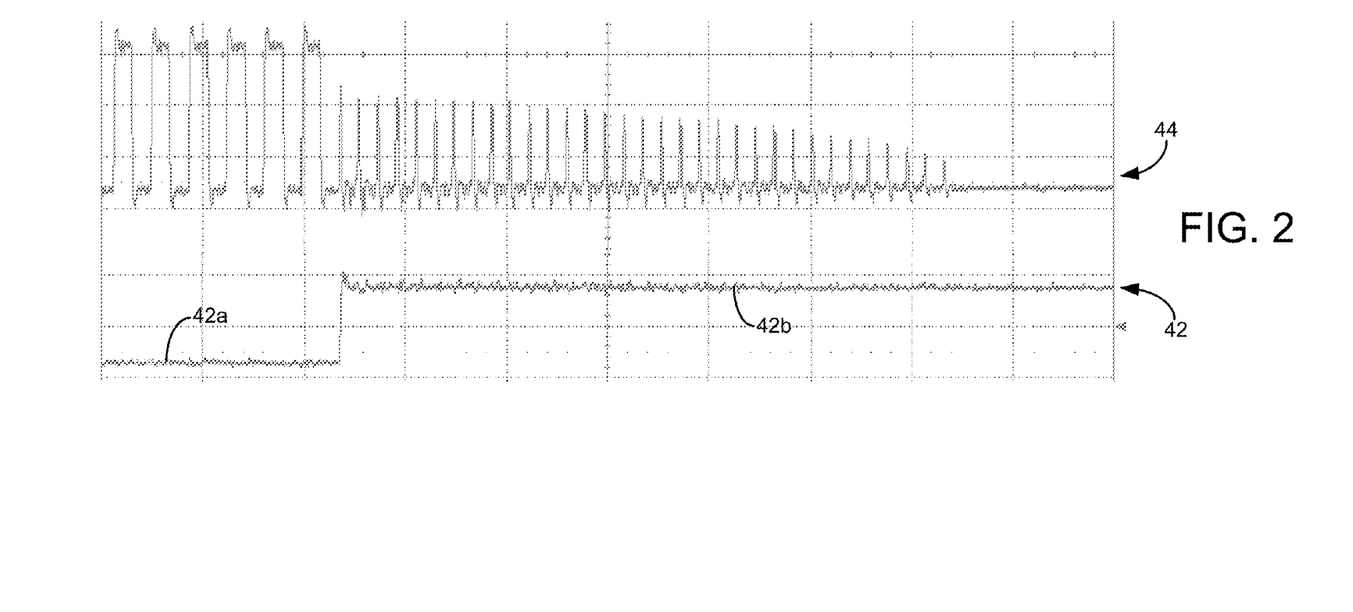
FIG. 2 is waveform diagram of signals produced from the random number generation system, illustrating the oscillating and latched states of the ring oscillator.

FIG. 2 is a waveform diagram of signals from system 10 (shown in FIG. 1) over time, illustrating the oscillating and latched states of ring oscillator 14. As shown in FIG. 2, the waveform diagram includes signal waveforms 42 and 44, which respectively correspond to sampled control signals from signal generator 12 (taken from control line 20) and sampled signals from the output of XOR gate 22 (taken from signal line 24).

As shown, when the control signal of signal waveform 42 has a logic level "0" (shown as waveform segment 42a), the signal of signal waveform 44 oscillates between logic levels "0" and "1". This corresponds to ring oscillator 14 operating in the oscillating state, where the signal desirably accumulates phase drift. When the control signal from signal generator 12 is flipped to logic level "1" (shown as waveform segment 42b), the output signal settles over time to a logic level. This corresponds to ring oscillator 14 operating in the latched state. As shown, when the transition from the oscillating state to the latched state occurs, the previous oscillation edges of the output signal continue to cycle through the ring. In addition, the positive feedback that occurs during the latched state causes an additional edge to propagate, thereby effectively doubling the frequency of the pulses. Furthermore, the pulses of signal waveform 44 gradually diminish over time until the signal settles to the logic level "0". This corresponds to the output signal on output line 30.

As discussed above, when the control signal has a logic level "1", counter 16 begins counting the pulses of the settling output signal. Counter 16 continues to count the pulses until a stopping signal is received (e.g., when the control signal switches to a logic level "0"). Whitener 18 then latches the logic level of the settled output signal and the corresponding pulse count to generate random numbers. As discussed above, the logic level of the settled output signal and the pulse counts required to reach the settled logic level each exhibit randomness attained from the accumulated phase drifting. In fact, the pulse counts, which correspond to the settling time, effectively amplify the randomness obtained from the phase drifting. As such, the pulse counts, as well as the value of the logic level itself, provide high levels of entropy for generating random numbers for a variety of applications.

Figure 3:
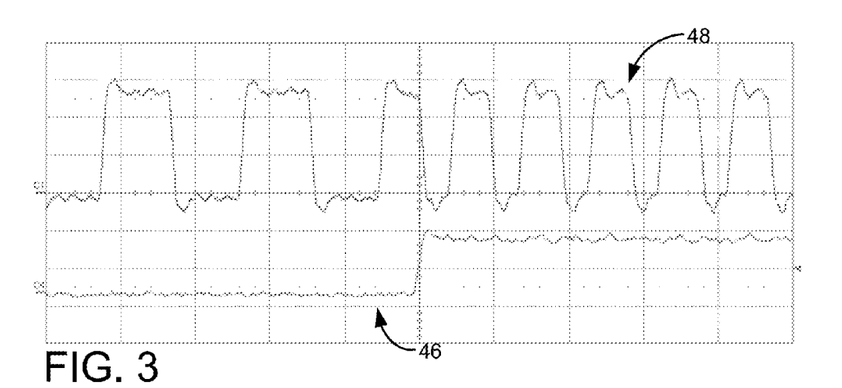
FIG. 3 is a waveform diagram of a signals produced from the random number generation system, illustrating a situation in which a leading edge of a control signal bisects a pulse of an oscillating signal.
Figure 4:
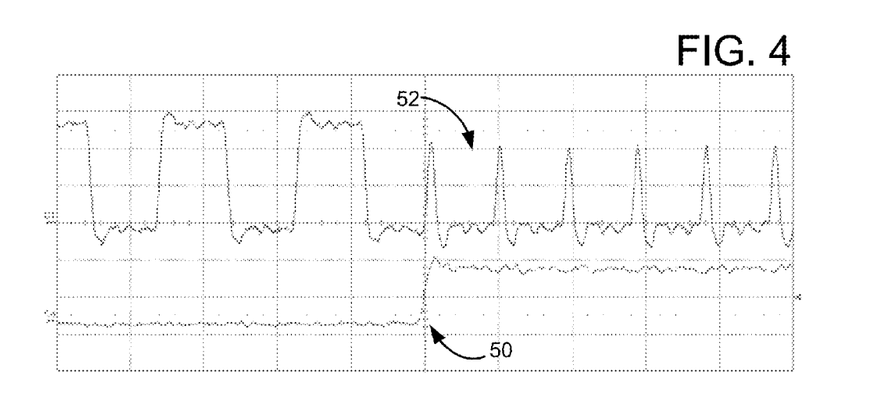
FIG. 4 is a waveform diagram of a signals produced from the random number generation system, illustrating a situation in which a leading edge of a control signal is close in time to a leading edge of a pulse of an oscillating signal.
Figure 5:
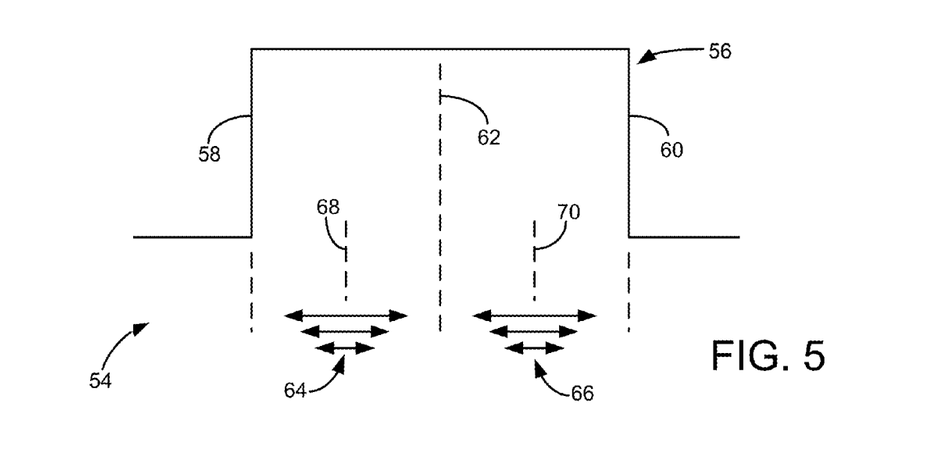
FIG. 5 is a simplified waveform diagram of an oscillating signal produced from the random number generation system, illustrating regions of a pulse of the oscillating signal.

FIGS. 3-5 are waveform diagrams of signals from system 10 (shown in FIG. 1) over time, illustrating the dependency of the settling time on the edge locations of the signal transmitting through XOR gate 22 relative to the edge locations of the control signal. As shown in FIG. 3, the waveform diagram includes signal waveforms 46 and 48, which correspond to signal waveforms 42 and 44 (shown in FIG. 2), respectively. This illustrates a situation in which the leading edge of the control signal on control line 20 substantially bisects the pulse of the signal transmitting through XOR gate 22.

In comparison to signal waveform 44, signal waveform 48 exhibits very little settling over the shown pulses. This illustrates a situation where the pulses of the output signal may remain present for substantial durations before settling. As such, the control signal may direct counter 16 to stop counting the pulses of the output signal prior to the output signal settling to a logic level. While this may reduce (i.e., truncate) the amplification effects of the settling time, the logic level and the pulse counts at the stopping point still exhibit suitable levels of randomness. Thus, in these situations, whitener 18 desirably latches the logic level and pulse counts of the output signal at the stopping point, and may rely on these non-settled values for generating random numbers. In alternative embodiments, the time period in which counter 16 may count the pulses may be extended to account for long settling times. However, extending the time period reduces the throughput of the output signals, which may correspondingly reduce the rate of random number generation in whitener 18.

As shown in FIG. 4, the waveform diagram includes signal waveforms 50 and 52, which also correspond to signal waveforms 42 and 44 (shown in FIG. 2), respectively. FIG. 4 illustrates an opposing situation from that shown in FIG. 3, in which the leading edge of the control signal on control line 20 is close in time to the leading edge of the pulse of the signal on signal line 24. In comparison to signal waveform 44 (shown in FIG. 2) and signal waveform 48 (shown in FIG. 3), signal waveform 52 settles rapidly. A similar situation may occur when the leading edge of the control signal on control line 20 is close in time to the trailing edge of the pulse of the signal on signal line 24. The rapid settling of the output signal may produce smaller pulse counts, thereby potentially reducing the attainable entropy seen in the resulting pulse count. However, the rapid settling allows a reduced counting period to be used, thereby increasing the throughput of the output signals.

FIG. 5 is a simplified waveform diagram of signal waveform 54, which is derived from signals sampled from the output of XOR gate 22 on signal line 24. As shown, signal waveform 54 includes pulse 56 defined by leading edge 58 and trailing edge 60, and having a midpoint 62. As discussed above for signal waveform 48 (shown in FIG. 3), when the leading edge of the control signal substantially bisects pulse 56 (i.e., at midpoint 62), the pulses of the output signal may remain stable for substantial durations before settling. This requires cutting off a portion of the pulse counts or reducing throughput of the output signals, either of which may reduce the entropy throughput. Alternatively, as discussed above for signal waveform 52 (shown in FIG. 4), when the leading edge of the control signal is close to either leading edge 58 or trailing edge 60, the pulses of the output signal may settle rapidly. This may reduce the amplification of the phase drifting, thereby also reducing the entropy throughput. Accordingly, the greatest entropy throughput may be attained from the signals of ring oscillator 14 when the leading edge of the control signal occurs in a region either between leading edge 58 and midpoint 62 (referred to as region 64), or between midpoint 62 and trailing edge 60 (referred to as region 66).

Examples of suitable ranges for region 64 include about 75% of a total distance between leading edge 58 and midpoint 62, with particularly suitable ranges including about 50% of the total distance, and even more particularly suitable ranges including about 25% of the total distance, where each of the ranges for region 64 are centered around location 68. Correspondingly, examples of suitable ranges for region 66 include about 75% of a total distance between midpoint 62 and trailing edge 60, with particularly suitable ranges including about 50% of the total distance, and even more particularly suitable ranges including about 25% of the total distance, where each of the ranges for region 66 are centered around location 70. Accordingly, locations 68 and 70 generally provide a good balance of signal throughput and phase drift amplification, thereby providing acceptable throughput of entropy. The optimum entropy throughput can be experimentally determined for each layout of the circuit.

Because ring oscillator 14 is started at a controlled time point, and because ring oscillator 14 desirably only operates in each oscillating state for a short period of time, the amount of phase drift that accumulates is typically containable to region 64 or region 66. However, in situations where the control signal from signal generator 12 may vary, or when external conditions may vary (e.g., when unsteady temperature and/or supply voltages cause unpredictable changes in the circuit timing), the phase drifting may result in the leading edge of the control signal occurring adjacent either leading edge 58, trailing edge 60, or midpoint 62. In one embodiment, the sampling point may be tuned with a phase-locked loop circuit to restrain the leading edge of the control signal to region 64 or region 66. In alternative embodiments, as discussed below, ring oscillator 14 may incorporate multiplexer assemblies to modify the delay time through ring oscillator 14.

Figure 6:
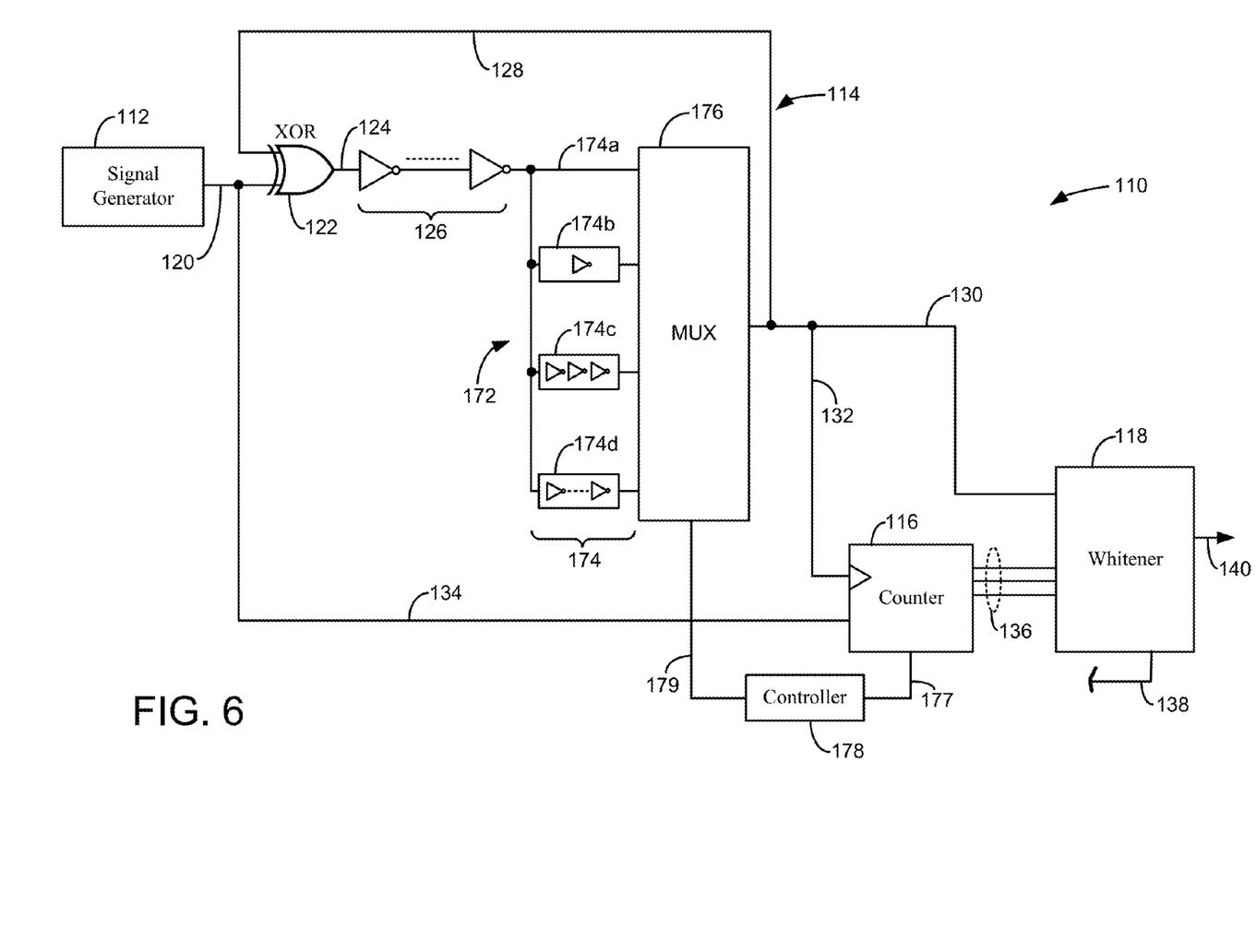
FIG. 6 is a logic diagram of a first alternative system, in which a ring oscillator of the system includes a multiplexer.

FIG. 6 is a logic diagram of system 110, which is an alternative to system 10 (shown in FIG. 1), where the respective reference labels are increased by "100". System 110 functions in generally the same manner as system 10, but is configured to increase the likelihood of operating within pulse regions that provide the greatest throughput of entropy (e.g., regions 64 and region 66, shown in FIG. 5).

As shown in FIG. 6, ring oscillator 114 of system 110 further includes multiplexer assembly 172, which includes a plurality of delay elements 174 (e.g., delay elements 174a-174d) and multiplexer 176. Delay elements 174 are operably coupled between inverters 126 and multiplexer 176, and each desirably includes a different gate arrangement, such as different numbers of inverters, buffers, and/or the like. This allows the phase drift of the oscillating signal to be adjusted through the use of different delay elements 174. While shown with four delay elements 174, multiplexer assembly 172 may alternative include fewer or additional numbers of delay elements 174 to obtain desired design arrangements.

For example, delay element 174a may include a signal line coupling inverters 126 and multiplexer 176 (i.e., no gates), and any subsequent delay element 174 may include even-number increments of inverters and/or buffers. The combined number of inverters between inverters 126 and each of delay elements 174 desirably provide odd total numbers. This allows ring oscillator 114 to switch between the oscillating and latched states based on the control signals from signal generator 112 in the same manner as discussed above for ring oscillator 14 (shown in FIG. 1). Suitable combined number of inverters between inverters 126 and each of delay elements 174 include those discussed above for inverters 26 (shown in FIG. 1).

As further shown in FIG. 6, counter 116 is coupled to multiplexer 176 via control line 177, controller 178, and control line 179, which control (by preset criteria) which delay element 174 is selected to output from multiplexer 176 to output line 130. Accordingly, when signal generator 112 transmits a control signal to XOR gate 122 having a logic level "0", XOR gate 122 outputs a signal having the same logic level as the feedback signal received from feedback line 128. The signal cycling through ring oscillator 114 continues to oscillate between the logic levels "0" and "1" due to the odd number of inverters between inverters 126 and the inverters of the given delay element 174 that is presently selected. While ring oscillator 114 remains in this oscillating state, the resulting output signal from ring oscillator 114 (along output line 130) oscillates between the logic levels "0" and "1" with the pulse phases randomly drifting due to system noise.

When a random number is desired, signal generator 112 may set the signal 120 to logic level 0 to start the ring oscillator, and after a predetermined time period it may flip the control signal transmitted to XOR gate 122 to a logic level "1". In response, XOR gate 122 switches from functioning as a delay element to functioning as an inverter. This effectively provides an even number of inverters in ring oscillator 114, which causes the oscillating output signal on output line 130 to begin to settle to a logic level. Counter 116 counts the pulses of the settling output signal in the same manner as discussed above. However, in this embodiment, counter 116 also desirably includes a lower count threshold and an upper count threshold. If the resulting pulse count is either less than the lower count threshold or exceeds the upper count threshold, counter 16 transmits a control signal over control line 178 to multiplexer 176 to advance to another delay element 174. This process may be repeated in an automated manner until the desired position is found (e.g., at locations 68 and 78, shown in FIG. 5). The use of multiplexer assembly 172 in this manner allows the sampling point to be tuned in response to factors such as variations in the control signal from signal generator 112, unpredictable changes in the circuit timing due to unsteady temperatures and/or supply voltages cause, and the like.

Figure 7:
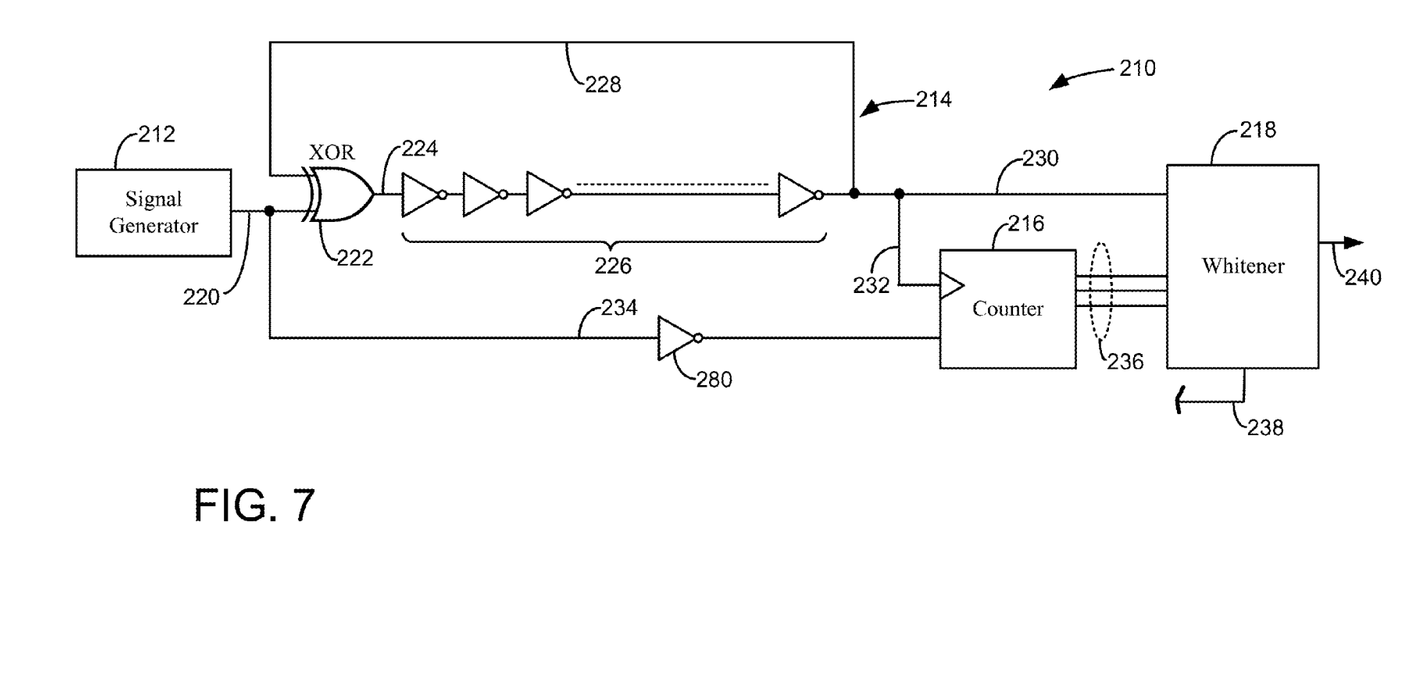
FIG. 7 is a logic diagram of a second alternative system, illustrating a ring oscillator having an alternative inverter design.

FIG. 7 is a logic diagram of system 210, which is an additional alternative to system 10 (shown in FIG. 1), where the respective reference labels are increased by "200". As shown in FIG. 7, system 210 functions in generally the same manner as system 10. However, ring oscillator 214 of system 210 includes an even number of inverters 226. This is in contrast to the odd number of inverters 26 in system 10. Examples of suitable numbers of inverters 226 range from 4 inverters to 100 inverters, with particularly suitable numbers range from 10 inverters to 70 inverters, and with even more particularly suitable numbers ranging from 16 inverters to 30 inverters. Ring oscillator 214 may also include a variety of other gates (e.g., buffer gates) and design arrangements, as discussed above for ring oscillator 14.

Furthermore, system 210 also includes inverter 280 on signal line 234, which inverts the polarity of the control signal from signal generator 212 to counter 216. Accordingly, ring oscillator 214 functions under opposite polarities compared to ring oscillator 12 of system 10. As shown above in Table 1, when the control signal from signal generator 212 has a logic level "1", XOR gate 222 functions as an inverter in the same manner as XOR gate 22. However, because ring oscillator 214 includes an even number of inverters 226, the additional inverter functionality of XOR gate 222 effectively provides an odd number of inverters for ring oscillator 214. This allows ring oscillator 214 to operate in the oscillating state while the control signal has a logic level "1", thereby allowing the output signal to oscillate and accumulate phase drift.

When a random number is desired, signal generator 212 may set the signal 120 to logic level "1" to start the ring oscillator, and after a predetermined time period it may flip the control signal transmitted to XOR gate 222 to a logic level "0". As shown in Table 2, when the control signal has a logic level "0", XOR gate 222 functions as a delay element, thereby providing an even number of inverters 226 for ring oscillator 214. This places ring oscillator 214 in the latched state and allows the output signal to settle to a logic level. Counter 216 may begin counting the pulses of the output signal from ring oscillator 214 in the same manner as discussed above for system 10.

This embodiment may also be incorporated into the multiplexer design of system 110 (shown in FIG. 6). In additional alternative embodiments, the ring oscillators may include XNOR gates in lieu of XOR gate 22 (having an odd number of inverters), XOR gate 122 (having an odd number of inverters), and/or XOR gate 222 (having an even number of inverters), or a multiplexer, or another type of digital switch. Accordingly, the random number generation systems of the present disclosure may incorporate ring oscillators having a variety of different design arrangements for switching between oscillating and latched states.

Figure 8:
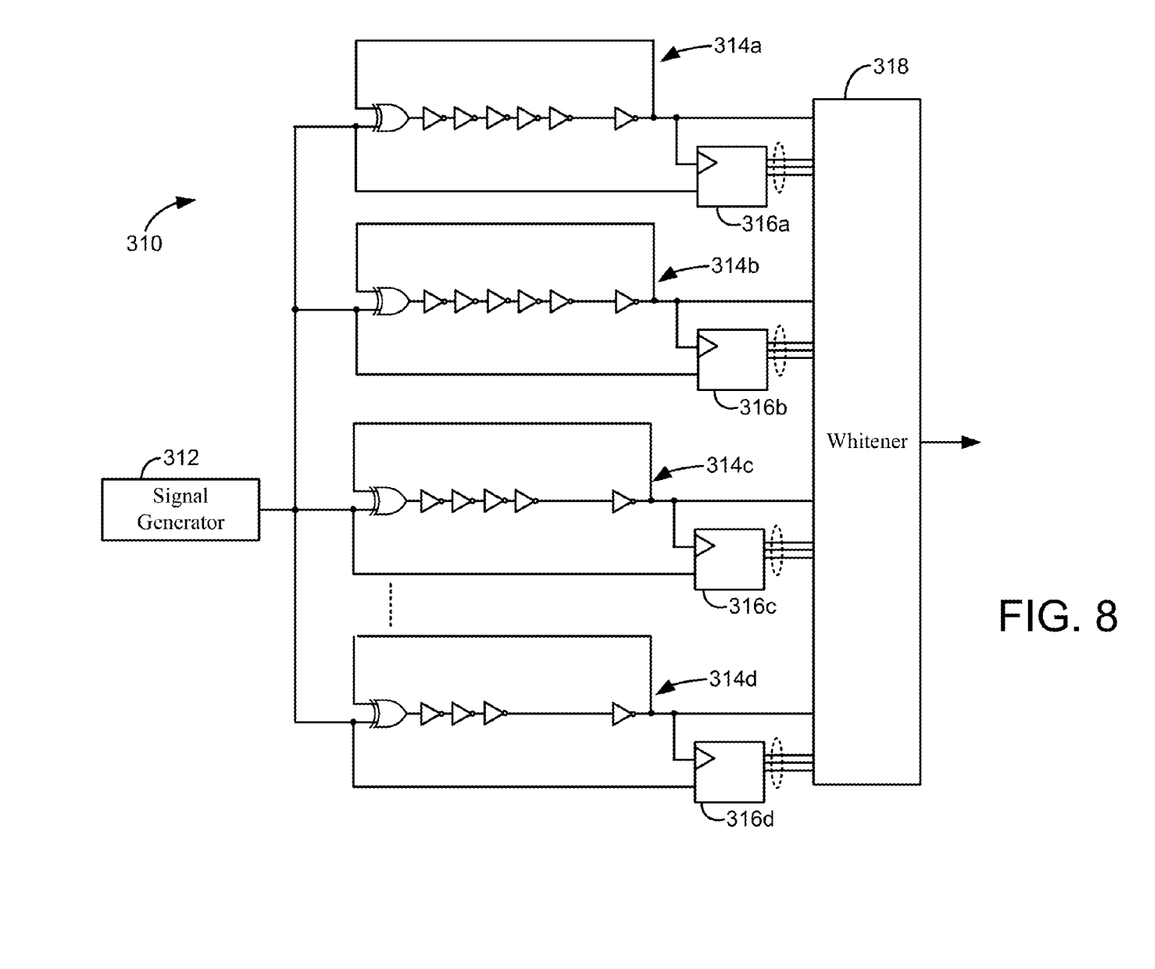
FIG. 8 is a logic diagram of a third alternative system, which includes multiple ring oscillators.

FIG. 8 is a logic diagram of system 310, which is an additional alternative to system 10 (shown in FIG. 1), where the respective reference labels are increased by "300". As shown in FIG. 8, system 310 includes multiple groups of ring oscillators 314 and counters 316 (referred to as ring oscillators 314a-314d and counters 316a-316d). In this arrangement, a single signal generator 316, or a plurality of signal generators may provide control signals to each group of ring oscillators 314 and counters 316, and the resulting logic levels and pulse counts from the multiple groups may be combined in whitener 318. This arrangement allows ring oscillators 314a-314d to each switch between and oscillating state and a latched state, as discussed above.

While shown with four ring oscillators 314 (i.e., ring oscillators 314a-314d), system 310 may alternatively include a variety of different number of ring oscillators 314, depending on the desired arrangement. Ring oscillators 314a-314d may each include any of the above-discussed designs (e.g., ring oscillators 14, 114, and 214), and desirably have different oscillation frequencies to reduce the risk of synchronization. For example, each of ring oscillators 314a-314d may include different numbers of inverters. The use of system 310 in this manner allows ring oscillator 314a-314d to operate in parallel, thereby increasing the throughput of entropy from system 314.

In another aspect of the present disclosure (shown in FIGS. 9-12), the random number generation system may include a ring oscillator having a complex feedback network or circuit. In this complex feedback loop, the oscillating signal that loops back through the ring may also be fed back again in the middle of the feedback loop, effectively forming multiple interconnected rings. Over successive cycles through the ring oscillator, the oscillating output signal desirably accumulates random phase drift due to noise from external system sources. The multiple interconnected rings, however, effectively increase the randomness obtained from the phase drift due to the multiple feedback loops.

Figure 9:
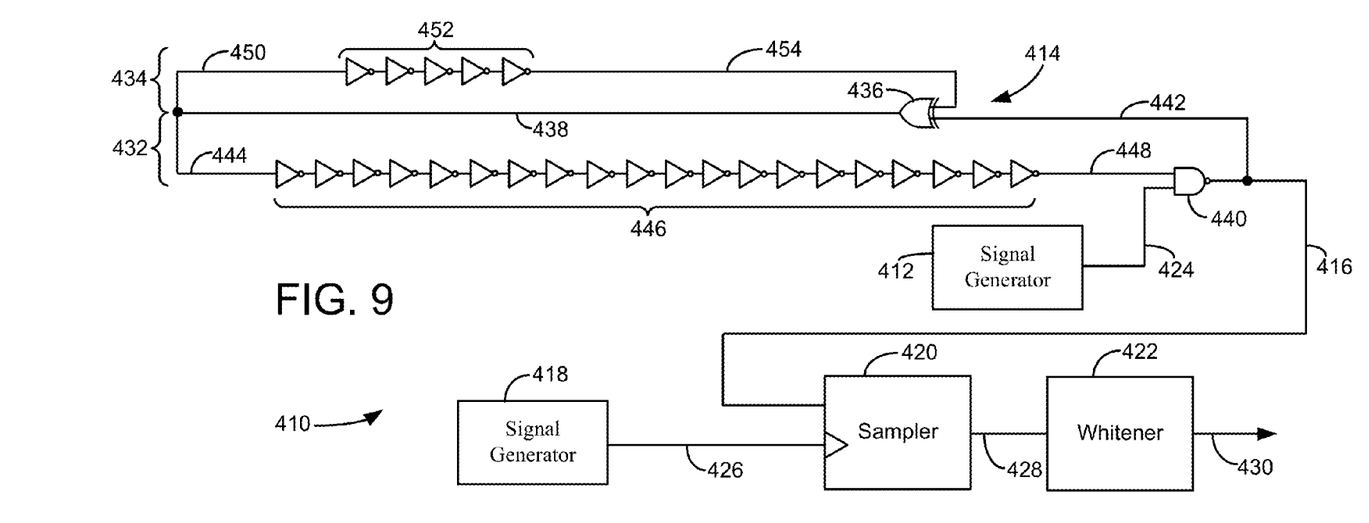
FIG. 9 is a logic diagram of a random number generation system of a second embodiment of the present disclosure, which includes a ring oscillator having a complex feedback network for a primary gate chain (i.e., a delay line).

FIG. 9 is a logic diagram of system 410, which is a random number generation system that includes a ring oscillator having a complex feedback network. As shown, system 410 includes signal generator 412, ring oscillator 414, output line 416, signal generator 418, sampler 420 and whitener 422. Signal generators 412 and 418 are controller-operated signal generators that generate and transmit control signals along input lines 424 and 426, respectively. Signal generator 412 may be any suitable type of signal generator, such as a pulse generator, and desirably provides a control signal for generating an oscillating signal in ring oscillator 414. Signal generator 418 may also be any suitable type of signal generator, such as a pulse generator, and provides control signals to sampler 420 via signal line 426. This arrangement allows sampler 420 to sample output signals from ring oscillator 414 via output line 416 based on the control signals from signal generator 418.

The resulting sampled signals from sampler 420 may then be transmitted to whitener 422 over signal line 428. Whitener 422 is a mechanism for modifying statistical distributions of the signals received from sampler 420. Examples of suitable mechanisms for whitener 422 include those discussed above for whitener 18 (shown in FIG. 1). Accordingly, whitener 422 is configured to whiten the received signals from sampler 420 to generate random numbers. The resulting generated random number may be transmitted from whitener 422 on output line 430 to a desired location. The generated random number accordingly exhibits entropy based in part on the phase drift accumulated by the complex feedback network of ring oscillator 414.

Ring oscillator 414 includes primary gate chain 432 and secondary feedback network 434, where the feedback network contains XOR gate 436 and feedback line 438. Primary gate chain 432 also includes NAND gate 440, feedback line 442, return line 444, inverters 446, and signal line 448. Similarly, the feedback network 434 also includes return line 450, inverters 452, and feedback line 454.

NAND gate 440 has a first input coupled to control line 424 and a second input coupled to signal line 448. NAND gate 440 also has an output coupled to output line 416, where output line 416 is also coupled to feedback line 442 for routing the output signal to XOR gate 436. XOR gate 436 is an exclusive OR gate having a first input coupled to feedback line 442 and a second input coupled to feedback line 454. XOR gate 436 also has an output coupled to feedback line 438, where feedback line 438 splits into return lines 444 and 450.

Return line 444 is coupled to the first inverter of inverters 446. Inverters 446 are a first set of inverters, and desirably include an even number of inverters. Examples of suitable numbers of inverters for inverters 446 include those discussed above for system 210 (shown in FIG. 7). The last inverter of inverters 446 is correspondingly coupled to signal line 448, thereby allowing the signal produced from inverters 446 to transmit to the second input of NAND gate 440.

Return line 450 is coupled to the first inverter of inverters 452, which are a second set of inverters that desirably include an odd number of inverters. Examples of suitable numbers of inverters for inverters 452 include those discussed above for system 10 (shown in FIG. 1). The last inverter of inverters 452 is correspondingly coupled to feedback line 454, thereby allowing the signal produced from inverters 452 to transmit to the second input of XOR gate 436.

This arrangement shown in FIG. 9 allows the control signal transmitted to NAND gate 440 to start and stop the oscillations through ring oscillator 414. For example, when the control signal from signal generator 412 has a logic level "0" NAND gate 440 outputs a signal having a logic level "1" regardless of the input from signal line 450. However, when the control signal has a logic level "0", NAND gate 440 outputs a signal having an opposite polarity of the signal transmitting from inverters 446 via signal line 448. Thus, NAND gate 440 effectively functions as an inverter to allow the signal looping through ring oscillator 414 to oscillate between logic levels "0" and "1". While oscillating through primary gate chain 432, the signal desirably accumulates phase drift due to external system noise. Furthermore, the additional feedback through secondary feedback network 434 also desirably accumulates phase drift. The use of XOR gate 436 allows the signals looping through primary gate chain 432 and secondary feedback network 434 to be interdependent, thereby causing the phase drift from secondary feedback network 434 to combine with the phase drift from primary feedback network 432 and the switching artifacts, when some portions of the circuit temporarily form latches, due to positive feedback. This increases the overall entropy of the signal oscillating through ring oscillator 414.

When a sample of the oscillating signal is desired, signal generator 418 directs sampler 420 to sample an output signal from output line 416, and transmit the sampled signal to whitener 422 to generate a random number. The resulting random number then desirably includes entropy levels that are attained from the accumulated phase drift from ring oscillator 414.

In alternative embodiments, NAND gate 400 and/or XOR gate 436 may be replaced with different logic gates (e.g., NOR gates and/or XNOR gates, respectively). In these embodiments, the number of inverters for inverters 446 and 452 may be modified to accommodate the different logic gates. Additionally, while ring oscillator 414 is shown with a single secondary feedback network 434, ring oscillator 414 may alternatively include a plurality of additional feedback networks that are interconnected to increase the accumulation of phase drift.

Figure 10:
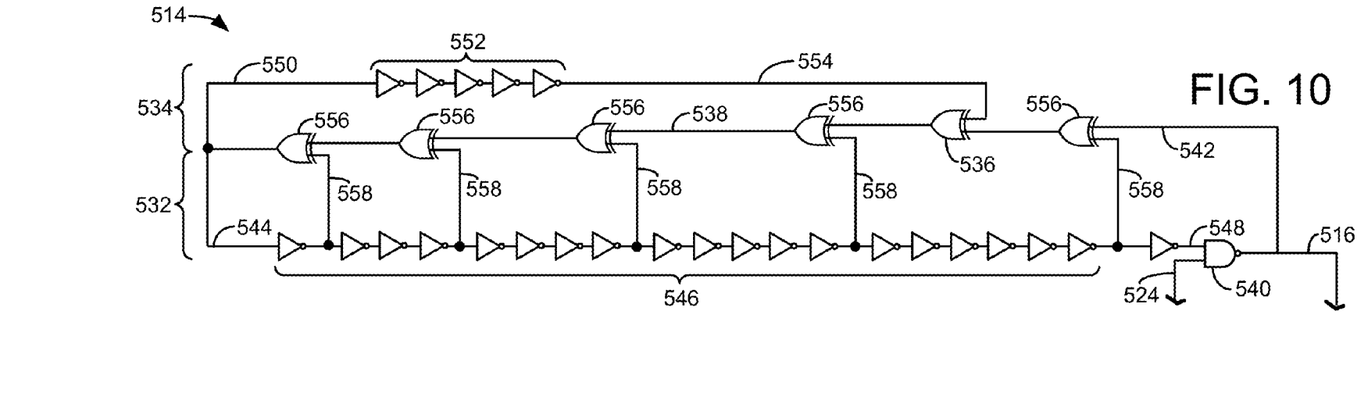
FIG. 10 is a logic diagram of a first alternative ring oscillator, which includes a Fibonacci-ring oscillator arrangement in which multiple signals of a primary gate chain, as well as its internal signals, control a feedback network.

FIG. 10 is a logic diagram of ring oscillator 514, which is an alternative to ring oscillator 414 (shown in FIG. 9), where the respective reference labels are increased by "100". Ring oscillator 514 operates in a similar manner to ring oscillator 414 for accumulating phase drift from multiple feedback networks. In addition, ring oscillator 514 includes multiple XOR gates 556 in a Fibonacci-ring oscillator arrangement. In this arrangement, XOR gates 556 each have a first input coupled to feedback line 538 (i.e., receives a signal from a previous XOR gate along feedback line 538), and a second input coupled to signal line 558 from inverters 546. This further increases the accumulation of phase drift by routing the oscillating signals back to feedback line 538 from various locations along inverters 546.

The numbers of XOR gates 556 and the locations of signal lines 558 relative to inverters 546 that are shown in FIG. 10 illustrate an example of a suitable arrangement for ring oscillator 514. In alternative embodiments, ring oscillator 514 may include different numbers of XOR gates 556 and signal lines 558, and may be placed are a variety of different locations along inverters 546. In an additional alternative embodiment, a similar XOR gate arrangement may be included for secondary feedback network 534.

Figure 11:
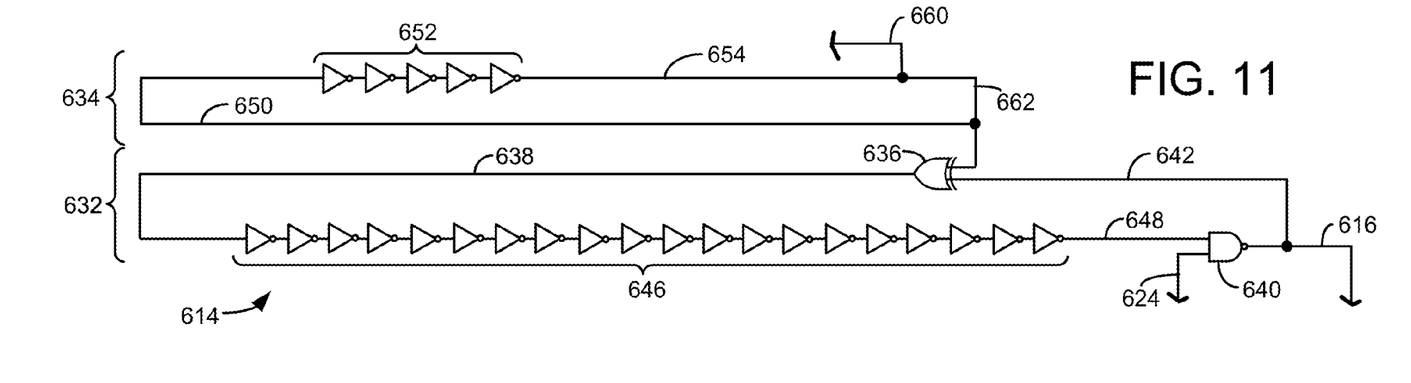
FIG. 11 is a logic diagram of a second alternative ring oscillator, which includes a separate ring oscillator constituting the complex feedback network.
Figure 12:
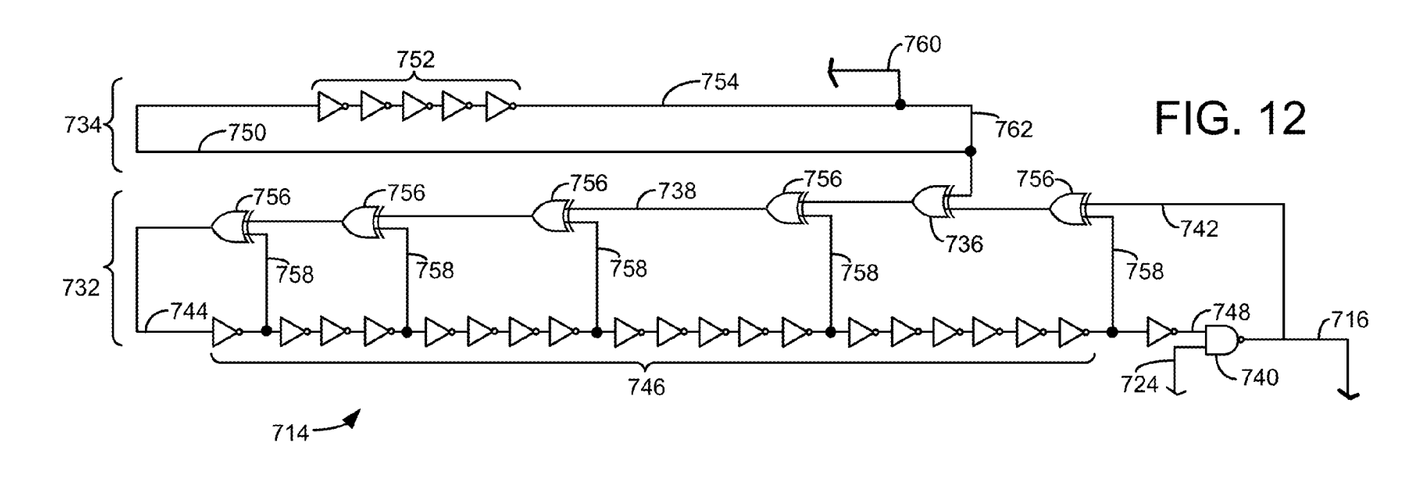
FIG. 12 is a logic diagram of a third alternative ring oscillator, which includes a Fibonacci-ring oscillator arrangement as the feedback network, in which the signal of an internal ring oscillator is also used to control the feedback.

FIGS. 11 and 12 are logic diagrams of ring oscillators 614 and 714, which are additional alternatives to ring oscillator 414 (shown in FIG. 9), where the respective reference labels are increased by "200" and "300", respectively. As shown in FIG. 11, ring oscillator 614 operates in a similar manner to ring oscillator 414 for accumulating phase drift from multiple feedback networks. However, in this embodiment, secondary feedback network 534 does not share feedback line 638 with primary gate chain 632. Instead, secondary feedback network 534 includes control line 660 and return line 662, where control line 660 is configured to transmit a control signal from a signal generator (not shown) for starting the signal oscillation through secondary feedback network 634. The signal oscillating through secondary feedback network 634 desirably accumulates phase drift, and is transmitted to XOR gate 636 to combine with the signal oscillating through primary feedback network 632, as discussed above.

As shown in FIG. 12, ring oscillator 714 is a combination of ring oscillator 514 (shown in FIG. 10) and ring oscillator 614 (shown in FIG. 11), which includes multiple XOR gates 656 in a Fibonacci-ring oscillator arrangement. Accordingly, the ring oscillators of this aspect of the present disclosure (e.g., ring oscillators 414, 514, 614, and 714) may include a variety of design arrangements to provide the complex feedbacks of the oscillating signals. The use of the multiple feedback networks in these arrangements allows the phase drift that accumulates in each of the feedback networks to be combined to further increase the level of entropy attainable with the oscillating signals. Furthermore, multiple ring oscillators of this aspect of the present disclosure (e.g., ring oscillators 414, 514, 614, and 714) may be operated in parallel in a similar manner that discussed above for system 310 (shown in FIG. 8). This may increase the throughput of entropy from the random number generation systems.

In yet another aspect of the present disclosure, the random number generation system may include a combination of the first and second aspects of the present disclosure. Thus, the ring oscillator may switch between an oscillating state and a latched state, and may also include a complex feedback network. This arrangement allows the entropy obtained from a settling signal to be further increased by the phase drift that accumulates through multiple, interconnected feedback networks.

Although the present disclosure has been described with reference to preferred embodiments, workers skilled in the art will recognize that changes may be made in form and detail without departing from the spirit and scope of the disclosure.

The invention claimed is:

1. A random number generation system comprising:
   a ring oscillator configured to switch between a first state in which a signal of the ring oscillator oscillates between logic levels, and a second state in which the signal at least partially settles to one of the logic levels;
   a counter configured to measure a count of pulses of the signal; and
   a mechanism configured to receive the signal from the ring oscillator, latch a logic level of the signal from the ring oscillator, latch the count of pulses from the counter, and generate a non-deterministic random number based on the logic level and the count of pulses.

2. The random number generation system of claim 1, wherein the ring oscillator comprises:

a plurality of inverters; and a gate operably coupled between a first and a second of the plurality of inverters, the gate being configured to switch the ring oscillator between the first state and the second state.

3. The random number generation system of claim 2, wherein the gate comprises an exclusive OR gate.

4. The random number generation system of claim 2, and further comprising a signal generator, wherein a first input of the gate is operably coupled to the signal generator.

5. The random number generation system of claim 1, wherein the ring oscillator further comprises a multiplexer having a plurality of circuits configured to adjust a pulse frequency of the signal.

6. The random number generation system of claim 1, wherein the counter is operably coupled to the ring oscillator and configured to count pulses of the signal while the ring oscillator is in the second state.

7. A random number generation system comprising:
a signal generator;
a plurality of inverters;
a gate comprising a first input operably coupled to the signal generator, a second input operably coupled to a first of the inverters, and an output operably coupled to a second of the inverters, wherein the gate is configured to function as an inverter when a signal from the signal generator is at a first logic level and as a buffer when the signal is at a second logic level;
a counter operably coupled to at least one of the plurality of inverters or the output of the gate; and
a whitener configured to:
receive an output signal from one of the plurality of inverters;
latch a logic level of the output signal;
latch a count of pulses from the counter; and
combine the logic level and the count of pulses to generate a non-deterministic random number.

8. The random number generation system of claim 7, wherein the gate comprises an exclusive OR gate.

9. The random number generation system of claim 7, further comprising a multiplexer having a plurality of circuits, the multiplexer operably coupled to at least one of the plurality of inverters or to the output of the gate.

10. A method comprising:
generating phase drift in an oscillating signal;
latching the oscillating signal to at least partially settle to a logic level;
latching a count of pulses that corresponds to a time required for the latched signal to settle to the logic level; and
combining the logic level and the count of pulses to generate a non-deterministic random number.

11. The method of claim 10, wherein generating the phase drift in the oscillating signal comprises transmitting the oscillating signal through a plurality of inverters.

12. The method of claim 11, wherein latching the oscillating signal comprises switching a gate, which is operably coupled to at least one of the plurality of inverters, from functioning as an inverter to functioning as a buffer.

13. A random number generation system comprising:
an oscillator comprising:
a gate chain comprising:
a first plurality of inverters; and
a gate having a first input operably coupled to a first of the first plurality of inverters, a second input, and an output, wherein a second of the first plurality of inverters is operably coupled to the output of the gate;
a feedback network comprising a second plurality of inverters, wherein the second input of the gate is operably coupled to one of the second plurality of inverters;
a counter operably coupled to an oscillator output from the oscillator and configured to measure a count of pulses of the oscillator output; and
a circuit configured to:
receive the oscillator output;
latch a logic level of the oscillator output;
latch the count of pulses from the counter; and
generate a non-deterministic random number by combining the logic level and the count of pulses.

14. The random number generation system of claim 13, wherein a second of the second plurality of inverters is operably coupled to the output of the gate.

15. The random number generation system of claim 13, wherein the gate comprises an exclusive OR gate.

16. The random number generation system of claim 13, wherein the gate is a first gate, and wherein the random number generation system further comprises:
a signal generator; and
a second gate having a first input operably coupled to the signal generator, a second input operably coupled to the output of the second of the first plurality of inverters, and an output, wherein the second input of the first gate is operably coupled to the output of the second gate.

17. The random number generation system of claim 16, wherein the second gate comprises a NAND gate.

18. The random number generation system of claim 13, and further comprising a plurality of XOR gates, wherein at least a portion of the XOR gates are operably coupled between the output of the gate and the at least one of the first plurality of inverters.

* * * * *